United States Patent
Evangelides, Jr.

(10) Patent No.: US 7,493,050 B2
(45) Date of Patent: Feb. 17, 2009

(54) OPTICAL COMMUNICATION SYSTEM HAVING AN ANTIRESONANT DISPERSION MAP SUPPRESSING FOUR WAVE MIXING AND CROSS PHASE MODULATION

(75) Inventor: Stephen G. Evangelides, Jr., Red Bank, NJ (US)

(73) Assignee: Red Sky Subsea, Ltd., Chelmsford (GB)

( * ) Notice: Subject to any disclaimer, the term of this patent is extended or adjusted under 35 U.S.C. 154(b) by 491 days.

(21) Appl. No.: 10/453,898

(22) Filed: Jun. 3, 2003

(65) Prior Publication Data
US 2004/0037562 A1 Feb. 26, 2004

Related U.S. Application Data

(60) Provisional application No. 60/404,617, filed on Aug. 20, 2002.

(51) Int. Cl.
H04B 10/12 (2006.01)
(52) U.S. Cl. .................................. 398/148; 398/81
(58) Field of Classification Search ............. 398/81, 398/147, 148, 159
See application file for complete search history.

(56) References Cited

U.S. PATENT DOCUMENTS

| 6,324,317 B1 | 11/2001 | Tanaka et al. ............... 385/24 |
| 6,427,043 B1 | 7/2002 | Naito ......................... 385/24 |
| 2002/0028052 A1 | 3/2002 | Bickham et al. ............. 385/123 |
| 2002/0093706 A1 | 7/2002 | Lu et al. ...................... 359/124 |
| 2002/0131132 A1 | 9/2002 | Tanaka et al. ................ 359/179 |
| 2002/0131711 A1 | 9/2002 | Tanaka et al. ................. 385/39 |

OTHER PUBLICATIONS

S.G. Evangelides, Jr. et al., "Energy Transfers and Frequency Shifts from Three Soliton Collisions in a Multiplexed Transmission Line with Periodic Amplification," *Journal of Lightwave Technology*, vol. 14, No. 7, Jul. 1996, pp. 1639-1643.

Ting-Kuang Chiang et al., "Cross-Phase Modulation in Dispersive Fibers: Theoretical and Experimental Investigation of the Impact of Modulation Frequency," *IEEE Photonics Technology Letters*, vol. 6, No. 6, Jun. 6, 1994, pp. 733-736.

P.V. Mamyshev et al., "Pseudo-Phase-Matched Four-Wave Mixing in Soliton Wavelength-Division Multiplexing Transmission," *Optics Letters*, vol. 21, No. 6, Mar. 15, 1996, pp. 396-398.

K. Inoue., "Phase-Mismatching Characteristic of Four-Wave Mixing in Fiber Lines With Multistage Optical Amplifier," *Optics Letters*, vol. 17, No. 11, Jun. 1, 1992, pp. 801-803.

S.G. Evangelides, Jr., "Cross Phase Modulation Resonances in WDM Systems," Optical Fiber Communications Conference, 1999: ThQ1, pp. 240-242.

*Primary Examiner*—Christina Y Leung
(74) *Attorney, Agent, or Firm*—Choate, Hall & Stewart LLP; Sam Pasternack

(57) ABSTRACT

An optical communication system transmitting a plurality of channel wavelengths is provided. The system includes a transmitter unit, a receiver unit, and an optical transmission path interconnecting the transmitter and receiver units. The transmission path has a concatonation of optical fibers defining a dispersion map such that each of the channel wavelengths are located at FMX and XPM antiresonances at which FWM and XPM are suppressed.

19 Claims, 6 Drawing Sheets

OPTICAL COMMUNICATION SYSTEM HAVING AN ANTIRESONANT DISPERSION MAP SUPPRESSING FOUR WAVE MIXING AND CROSS PHASE MODULATION

STATEMENT OF RELATED APPLICATION

This application claims the benefit of priority to U.S. Provisional Patent Application Ser. No. 60/404,617, filed Aug. 20, 2002 and entitled "The Antiresonant Dispersion Map."

FIELD OF THE INVENTION

The present invention relates generally to optical transmission systems, and more particularly to a dispersion map for an undersea optical transmission system.

BACKGROUND OF THE INVENTION

The introduction of multigigabit, multiwavelength optical communication systems operating over long distances (e.g., transoceanic) and high average powers has resulted in the exploration of fiber designs that can minimize signal degradation. Fibers in such systems typically have losses in the range of about 0.20 to 0.25 dB/km. To increase bandwidth, fibers need to be redesigned to reduce a number of nonlinear and polarization effects that become increasingly important at high bit rates and high powers. In particular transmission performance is limited by a number of phenomena, including accumulation of amplified spontaneous emission (ASE) noise, dispersion, and a nonlinear component to the refractive index of the fiber. For amplitude modulated digital signals temporal distortions due either to dispersion or Kerr effect are a significant contributing factor to the bit error rate (BER).

A design solution to minimize the effects of dispersion and Kerr effect nonlinearities is not simple. The obvious solution to dispersive waveform distortions is to have the fiber dispersion set to zero at the signal wavelength. When signals travel at the zero dispersion wavelength they do not suffer any temporal distortions. However, a signal traveling at the zero dispersion wavelength and ASE noise generated by the optical amplifiers travel at similar velocities so that there is good phase matching, and thus they have the opportunity to interact over long distances, via the Kerr effect. The result is the transfer of power out of the signal and into unwanted wavelengths. Similarly, if two, or more signal channels are located around the zero dispersion wavelength they will be well phase matched and thus interact strongly. As a result of the interaction, energy will be transferred from one signal to another leading to waveform distortions. Conversely if the signal propagates at a wavelength for which the dispersion is large then there is a large phase mismatch (i.e., a group velocity difference) between the signal and noise or two adjacent signal channels, which greatly reduces the efficiency of four wave mixing. However, large values of dispersion result in increased inter-symbol interference due to the temporal spreading of the signal.

In summary, the following competing system design factors need to be taken into account. If the fiber has non-zero chromatic dispersion, then pulse spreading results, with attendant intersymbol interference. On the other hand, if chromatic dispersion is zero everywhere along the transmission fiber then non-linear effects such as four-wave-mixing will cause power transfers between signal channels as well as between signal and noise. In either case the result is a degradation in system performance.

An important advance in the implementation of multichannel WDM systems has been the use of dispersion management techniques. In view of the above mentioned conflicting demands, the basic principle of dispersion management is to keep local dispersion non-zero but make the overall system dispersion substantially zero. This can be accomplished by using a dispersion map in which the zero dispersion wavelengths of the constituent fibers are chosen so that they are appropriately far from the system's operating wavelengths. Constituent fibers with different zero dispersion wavelengths are then arranged in some periodic fashion so that the path average dispersion for the whole transmission line is appropriately small. For example, the transmission line may be divided into two or more sections approximately equal in length. In one section, the optical fiber has a zero dispersion wavelength less than the operating wavelengths. The following section has optical fiber with a zero dispersion wavelength greater than the operating wavelengths. The overall transmission line is thus constructed in a periodic manner from a concatenation of fiber sections having different zero dispersion wavelengths. By constructing the transmission line out of alternating lengths of positive and negative dispersion fiber, the path average dispersion can be adjusted so that it causes minimal temporal distortion. Moreover, by selecting the local dispersions of the constituent fibers to be large in magnitude, and making the period of the dispersion map an appropriate length, nonlinear interactions can be suppressed. The path-average dispersion of a fiber span of length L may be mathematically denoted as:

$$D_{average} = \int D(z')dz$$

For applications involving the transmission of non-return-to-zero (NRZ) data, the desired $D_{average}$ is zero, while, for soliton data transmission, the desired $D_{average}$ is in the range of about 0.05 to 0.5 picoseconds per nanometer-kilometer.

The principle of using large local values of dispersion to suppress nonlinear interactions and concatenating segments of such fiber with opposite delay values to ensure temporal fidelity of the signal is sound. However the transmission line is a periodic structure; the regularly spaced amplifiers give rise to periodic fluctuations in the signal energy. This introduces an asymmetry to the FWM and XPM between signal channels as they traverse the line that can actually enhance these processes. So despite the use of dispersion maps to suppress nonlinear interactions, FWM and XPM can still be problematic. The periodicity of the transmission line can resonantly enhance FWM between channels that were otherwise poorly phase matched. The periodicity can, under certain circumstances, also enhance XPM between two otherwise benign channels.

SUMMARY OF THE INVENTION

In accordance with the present invention, an optical communication system transmitting a plurality of channel wavelengths is provided. The system includes a transmitter unit, a receiver unit, and an optical transmission path interconnecting the transmitter and receiver units. The transmission path has a concotenation of optical fibers defining a dispersion map such that each of the channel wavelengths are located at FMX and XPM antiresonances at which FWM and XPM are suppressed.

In accordance with one aspect of the invention, a plurality of optical amplifiers are periodically located along the optical transmission path.

In accordance with another aspect of the invention, the dispersion map has a period substantially equal to the periodicity of the optical amplifiers.

In accordance with another aspect of the invention, each period of the dispersion map comprises at least a plurality of constituent fiber having different dispersion values.

In accordance with another aspect of the invention, the dispersion map has a period less than the periodicity of the optical amplifiers.

In accordance with another aspect of the invention, each period of the dispersion map comprises at least a plurality of constituent optical fibers with different cross-sectional areas.

In accordance with another aspect of the invention, each period of the dispersion map has a path average dispersion about equal to zero.

In accordance with another aspect of the invention, a method is provided for establishing a dispersion map for an optical transmission system transmitting a plurality of channel wavelengths. The optical transmission system has an optical transmission path that includes a plurality of optical amplifiers interconnected by respective transmission spans. The method begins by selecting a period for the dispersions map. Based on the selected dispersion map period and a channel spacing between adjacent ones of the channel wavelengths, a plurality of different dispersion values are selected for each period of the dispersion map such that each of the channel wavelengths are located at FMX and XPM antiresonances at which FWM and XPM are suppressed.

DETAILED DESCRIPTION

Resonant Four Wave Mixing for Constant Dispersion

Figure 1:
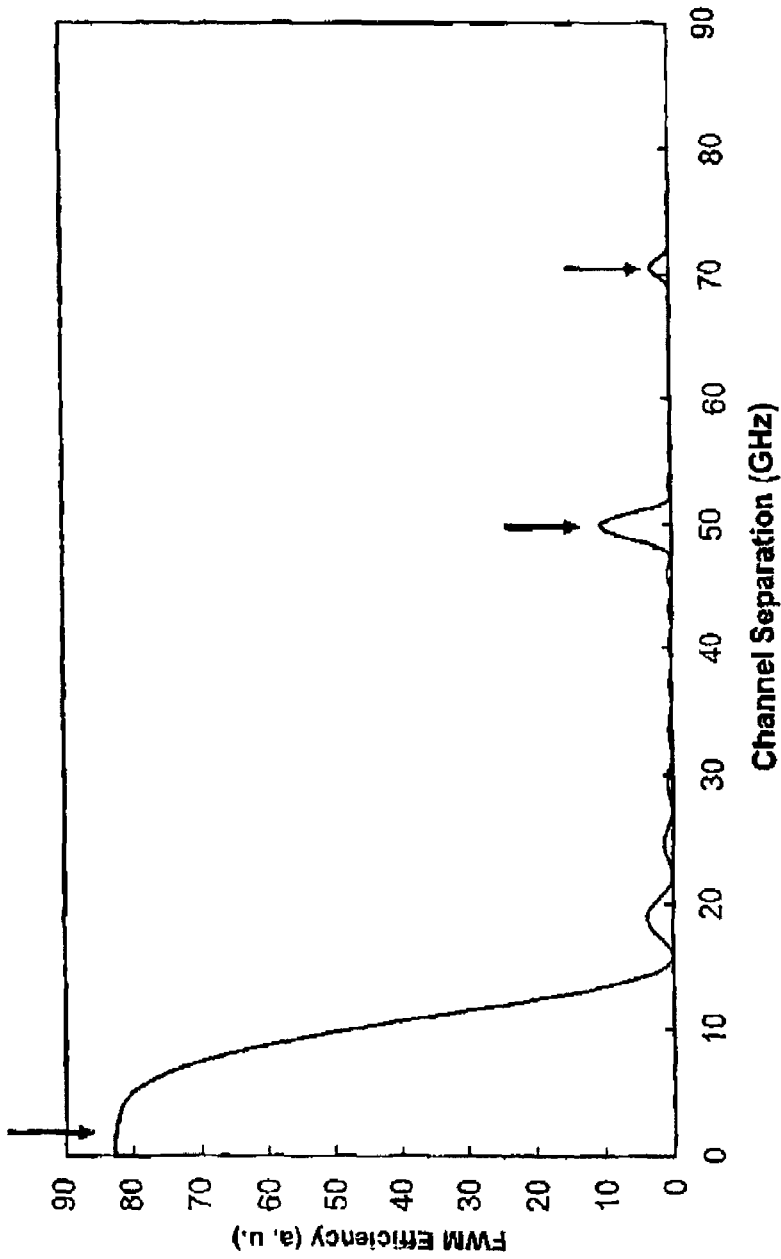
FIG. 1 shows the resonances in the FWM efficiency as a function of the channel spacing for a transmission path having 10 spans between adjacent optical amplifiers, with each span being 50 km in length.

Recent work, both theoretical and experimental, has demonstrated that the phenomenon of resonant four wave mixing in transmission lines can be greatly enhanced by the periodic fluctuations of signal intensity due to loss in the fiber and gain in the amplifiers. (See, for example, "Pseudo-phase-matched four wave mixing in soliton wavelength-division multiplexing transmission" P. V. Mamyshev and L. F. Mollenauer Optics Letters Vol. 21 No.6 Mar. 15, 1996; "Energy Transfers and Frequency Shifts from Three Soliton Collisions in a Multiplexed Line with Periodic Amplification" S. G. Evangelides and J. P. Gordon Journal of Lightwave Technology Vol. 14 No. 7 July 1996; "Phase-mismatching characteristic of four-wave mixing in fiber lines with multistage optical amplifiers" K. Inoue Optics Letters Vol. 17, No. 11 Jun. 1, 1992). In resonant four wave mixing, the periodicity of gain and loss along the transmission line serves to phase match (i.e., improve FWM efficiency) two wavelength channels that were otherwise mismatched (i.e., low FWM efficiency). The result, which was shown to be high efficiency FWM between adjacent channels, is commonly referred to as pseudo phase matched FWM. As with any resonance phenomenon, where there is enhancement in one part of parameter space there will be a region of parameter space for which the phenomenon is suppressed or damped. For example, FIG. 1 shows the resonances in the FWM efficiency as a function of the channel spacing for a transmission path having 10 spans between adjacent optical amplifiers, with each span being 50 km in length. The transmission path has a constant dispersion D=1 ps/nm-km.

The analysis of resonant four wave mixing to date has only considered a transmission path in which the dispersion is constant over its entire length. For such a system it has been shown that the resonance criterion is as follows:

$$L_{amp} = ML_{resonance} = \frac{2\pi N}{\Delta k} \quad (1)$$

where M is an integer and $\Delta k$ (the phase mismatch) is given by:

$$\Delta k = -\frac{\lambda^2 D}{2\pi c}\Delta\omega^2 \quad (2)$$

Equation 2 shows that the important parameters determining the location of the FWM resonances are the dispersion D, the channel spacing $\Delta\omega$ and the amplifier spacing $L_{amplifier}$. Given this, the regions of parameter space (i.e., D, $\Delta\omega$, $L_{amplifier}$) that enhance and suppress the FWM efficiency can be determined. Additional work (See the Inoue reference) gives the same result cast in slightly different terms. In this reference the optical power $P_F$ at the Stokes or anti Stokes frequency is calculated using the following equation.

$$P_F = \frac{1024\pi^6}{n^4\lambda^2c^2}(D\chi)^2 \frac{P(0)_p P(0)_q P(0)_r}{A_{eff}^2} e^{-\alpha l_N} \frac{1}{\alpha^2 + \Delta\beta^2} \times \left|\sum_{k=1}^{M} \exp\left(i\Delta\beta \sum_{j=1}^{k-1} l_j\right) \times \{\exp[(-\alpha + i\Delta\beta)l_k] - 1\}\right|^2 \quad (3)$$

Where the P(0) are the incident intensities, the $l_j$ the amplifier span lengths, $A_{eff}$ the fiber effective area, $\alpha$ the fiber loss coefficient, $\Delta\beta$ the phase mismatch and D is the dispersion. In the case of constant dispersion and span length the above simplifies to:

$$P_F = \frac{1024\pi^6}{n^4\lambda^2c^2}(D\chi)^2 \frac{P_p(0)P_q(0)P_r(0)}{A_{eff}^2} e^{-\alpha l_{amp}} \frac{[1 - e^{-\alpha l_{amp}}]^2}{\alpha^2} N^2\eta \quad (4)$$

Where $\eta$ is the FWM efficiency and is given by:

$$\eta = \frac{\alpha^2}{N^2(\alpha^2 + \Delta\beta^2)}\left[1 + \frac{4e^{-\alpha l_{amp}}\sin^2(\Delta\beta l_{amp}/2)}{[1 - e^{-\alpha l_{amp}}]^2}\right]\frac{\sin^2(N\Delta\beta l_{amp}/2)}{\sin^2(\Delta\beta l_{amp}/2)} \quad (5)$$

The terms multiplying $\eta$ in equation 4 do not contribute to the resonance behavior (they do not have denominators that go to zero for any relevant parameter value). Indeed they have only a weak monotonic dependence on $\alpha$, $A_{\mathit{eff}}$, $l_{\mathit{amplifier}}$ and $\Delta\omega$. The resonant behavior is contained in the $\eta$ term since it is the only term that has a denominator that goes to zero as the relevant parameters are changed. The resonance, or rapidly varying, piece of $\eta$ is:

$$\frac{\sin^2(M\Delta\beta l_{amp}/2)}{\sin^2(\Delta\beta l_{amp}/2)} \quad (6)$$

This is maximized when the denominator is 0

$$\tfrac{1}{2}\Delta\beta l_{amp}=N\pi$$

where N is an integer. This is the same result obtained in the Mamyshev and Mollenauer references (where $\Delta k=\Delta\beta$). So for a signal to fall exactly between two resonances the following must hold:

$$N\Delta\beta l_{amp}=4K\pi \text{ and } \tfrac{1}{2}\Delta\beta l_{amp}\neq Q\pi$$

for even values of N. where K and Q are integers. For odd values of N:

$$(N-1)\Delta\beta l_{amp}=4K\pi \text{ and } \tfrac{1}{2}\Delta\beta l_{amp}\neq Q\pi$$

It should be noted that there is an "envelope term" that multiplies the resonance term. The envelope is the Lorentzian:

$$\frac{\alpha^2}{(\alpha^2+\Delta\beta^2)}$$

which means that for widely spaced channels even the resonance behavior is diminished, giving additional suppression of all FWM especially at large channel separations. Indeed if $\Delta\beta$ is made large with respect to $\alpha$ the Lorentzian can be made to drop off faster.

While the above analysis was performed only for a transmission path with constant dispersion, it should be noted that in one case the Mollenauer and Mamyshev references did consider a complex dispersion map made up of segments of fiber of decreasing dispersion. However, this analysis was performed for the purpose of mitigating, or frustrating, the resonance behavior, and not, as discussed below, for the purpose of selecting antiresonances. For the purposes herein more complex dispersion maps than just dispersion maps made up of a single type of fiber having a constant dispersion are considered. The relevant equations can be solved numerically for complex dispersion maps. And the complex dispersion maps still exhibit resonant behavior.

Resonant Cross Phase Modulation for Constant Dispersion

Similar to resonant FWM, resonant XPM has been shown to arise in a transmission path, having periodic gain and loss. Indeed if the fiber were lossless the only result of XPM would be small temporal displacements in the pulse positions, but no induced frequency chirp. (See "Cross-Phase Modulation in Dispersive Fibers: theoretical and Experimental Investigation of the Impact of Modulation Frequency" Ting-Kuang Chiang, Nobukuki Kagi, Thomas K. Fong, Michel E. Marhic and Leonid G. Kazovsky IEEE Photonics Technology Letters Vol. 6 No. 6 June 1994; "Cross Phase Modulation Resonances in WDM Systems" S. G. Evangelides Proceedings OFC'99 ThQ1) An experimental confirmation of this phenomenon was demonstrated in "Resonances in Cross-Phase Modulation Impairment in Wavelength Division Multiplexed Lightwave Transmission," L. E. Nelson, R. M. Jopson, A. H. Gnauck, A. R. Chraplyvy. Proceedings of ECOC'99 Vol. 1 September 1999 p.204-20). Once again, there are regions of parameter space where the effects of XPM are greatly enhanced and regions where it is greatly diminished. The analysis is similar to the one for four wave mixing and begins with the equation describing the phase $\phi_j(z,t)$ induced on a signal $A_j$ due to another amplitude modulated signal $A_k$ in a fiber of length L.

$$\phi_j(L,t) = \quad (7)$$

$$\gamma_j\left[\frac{1-e^{-\alpha L}}{\alpha}\left|A_j\left(0,t-\frac{L}{v_{g,j}}\right)\right|^2 + 2\int_0^L\left|A_k\left(0,t-\frac{L}{v_{g,j}}+d_{jk}z'\right)\right|^2 e^{\alpha z'}dz'\right]$$

Where $\alpha$ is the loss coefficient, the $A_i$ field amplitudes, $v_{gj}$ the group velocity for the j field, and $d_{jk}\approx D\Delta\lambda_{jk}$, and $\gamma_j$ is the nonlinear coefficient. Assume $A_j$ is a cw field and the field $A_k$ is sinusoidally varying. If we look just at the time varying part and we get the following expression for $\Delta\phi_j$ at a distance L down the fiber.

$$\phi_j(L,t)=\Delta\phi\cos(\Omega_m(t-L/v_{g,j})+\phi) \quad (8)$$

Where $$\Delta\phi=2\gamma_j P_{km}\alpha L_{\mathit{eff}}\sqrt{\eta_{XPM}} \quad (9)$$

and $\phi$ is a constant determined by $\Omega$, D, $\Delta\lambda$, $\alpha$ and L. And $\eta_{XPM}$ is given by $$\eta_{XPM}=\frac{\alpha^2}{\Omega_m^2(D\Delta\lambda)^2+\alpha^2}\left[1+\frac{4\sin^2(\Omega D\Delta\lambda L/2)e^{-\alpha L}}{(1-e^{-\alpha L})^2}\right] \quad (10)$$

For systems with many (M) amplifier spans the $\Delta\phi$ for each span have to be summed to give the final phase shift.

$$\phi_{total}(t)=\sum_{i=1}^{M}\Delta\phi_i\cos[\Omega(t+D\Delta\lambda z_i)+\varphi_i] \quad (11)$$

The $\Delta\phi_i$ for each span of the transmission line are given by equation 9.

Figure 2:
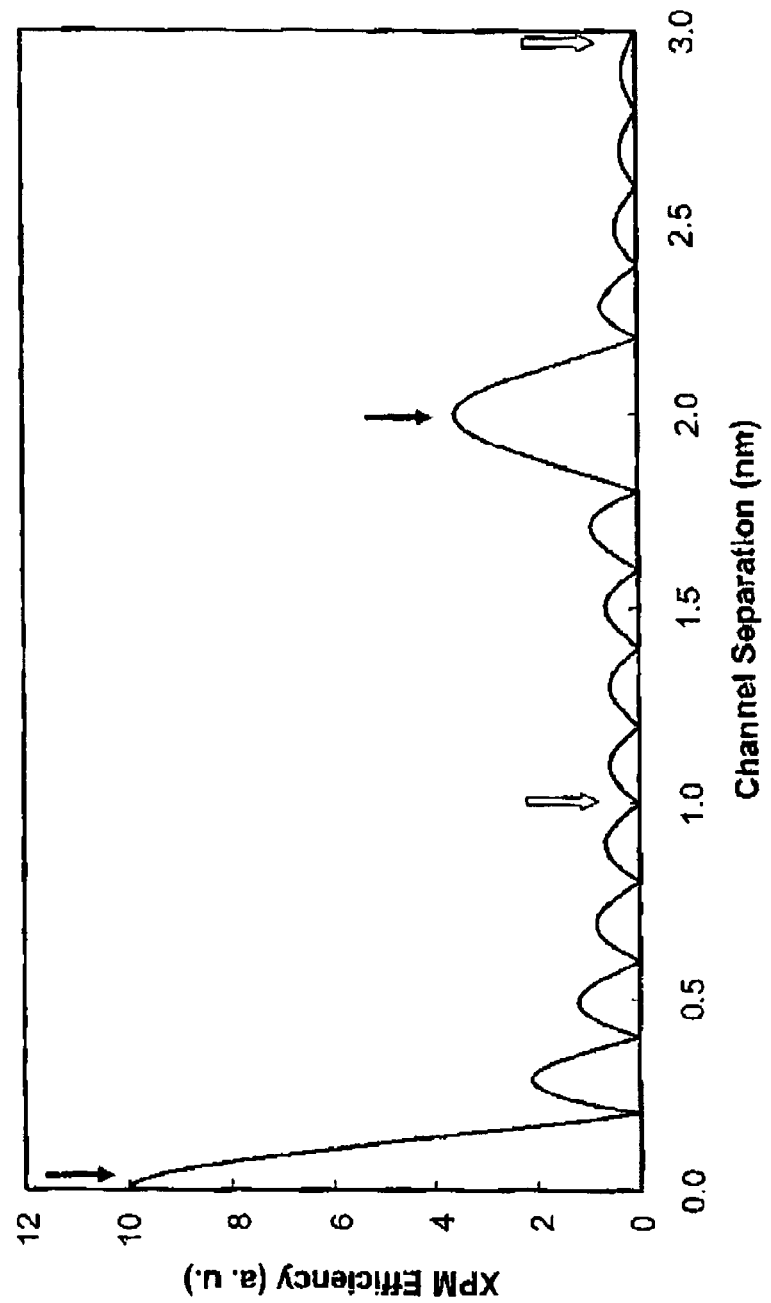
FIG. 2 shows the resonances in the XPM efficiency as a function of the channel spacing for a transmission path having 10 spans between adjacent optical amplifiers, with each span being 50 km in length.

For example, FIG. 2 shows the resonances in the XPM efficiency as a function of the channel spacing for a transmission path having 10 spans between adjacent optical amplifiers, with each span being 50 km in length. The transmission path has a constant dispersion D=1 ps/nm-km.

The calculation of the effects of cross phase modulation (XPM) in a transmission line having many periodically spaced amplifiers connected by identical spans of fiber with fixed constant dispersion yields a result that is surprisingly similar to that for FWM.

$$\Delta\phi_{XPM}=\Delta\phi_0\cdot\sqrt{\frac{\alpha^2}{\alpha^2+(\Omega D\Delta\lambda)^2}}\cdot\left|\frac{\sin(N\Omega D\Delta\lambda\, l_{amp}/2)}{\sin(\Omega D\Delta\lambda\, l_{amp}/2)}\right| \quad (12)$$

where $\Delta\phi$ is the amount of phase induced on one channel by another. Once again there is a resonance term and an envelope term. The resonance condition (where the denominator goes to zero) is:

$$D\Delta\lambda l_{amp} = MT_{bit} \quad (13)$$

where M is an integer, $T_{bit}$ is the duration of the bit period, D is the dispersion, $\Delta\lambda$ is the channel separation and $l_{amp}$ is the amplifier span length. For a channel to be located at an XPM minimum the channel spacing, span length and bitrate must satisfy the following relation:

$$\frac{N}{2} D\Delta\lambda l_{amp} = MT_{bit} \quad (14)$$

when N is even and M/N is not an integer. When N is odd the desired minima occur at the $\Delta\lambda$ satisfying this relation:

$$\frac{N-1}{2} D\Delta\lambda l_{amp} = MT_{bit} \quad (15)$$

Once again there is a Lorentzian term multiplying the resonance term (actually square root of Lorentzian)

$$\sqrt{\frac{\alpha^2}{\alpha^2 + (\Omega D \Delta \lambda)^2}}$$

Again, this indicates that as the channel spacing increases all XPM effects, including the resonances, will diminish (but more slowly). The resonances are indicated by the black arrows. The optimum XPM minima (i.e., antiresonances) are shown by the open arrows.

Figure 3:
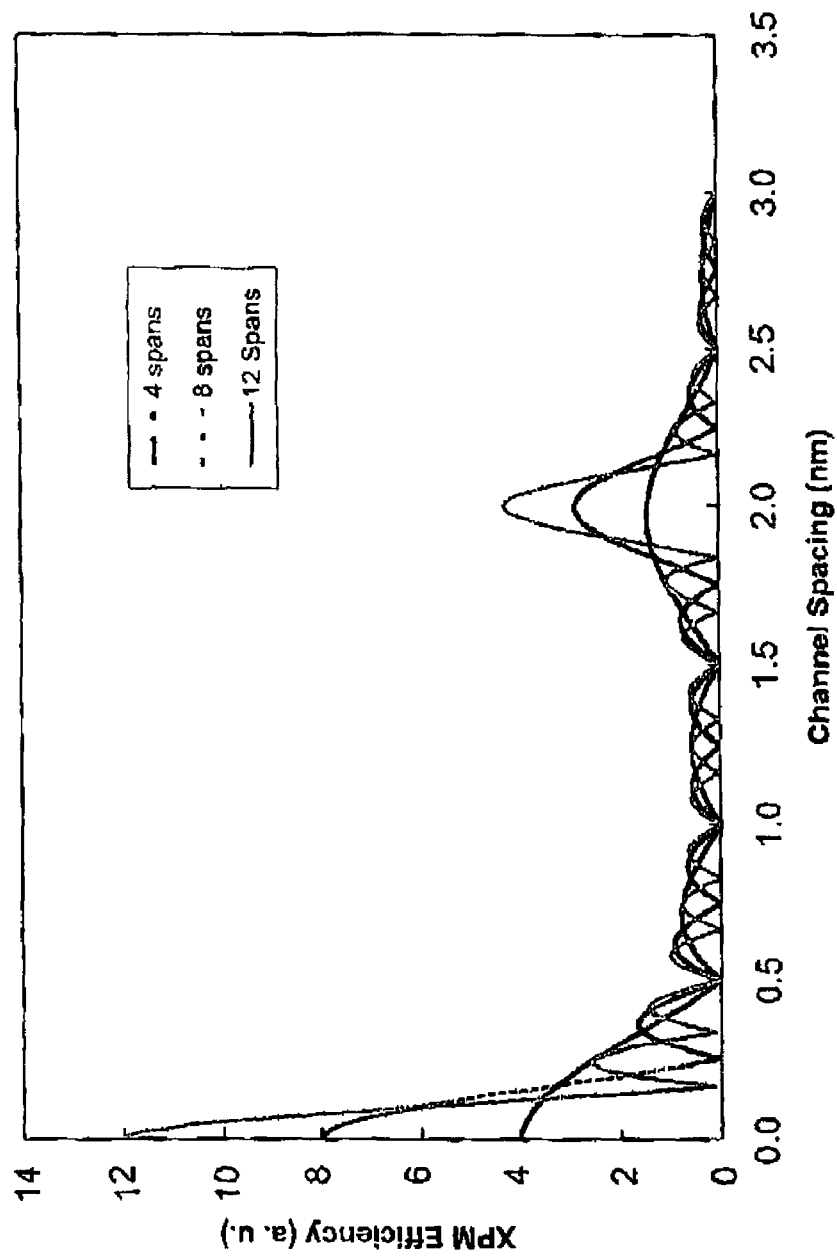
FIG. 3 shows the XPM efficiency as a function of the number spans employed in the transmission system.

Another similarity between the FWM and XPM resonance behaviors is that, as M, the number of amplifier spans, gets larger the width of the resonance gets smaller and its height gets proportionately larger. This result is shown in FIG. 3 for transmission paths with 4, 8 and 12 spans. As the resonance width narrows the available useable (antiresonant) parameter space becomes larger. That is, by appropriately selecting values for the parameters D, $\Delta\lambda$, $L_{amplifier}$ or $\Delta\omega$, an increase in the size of the design space can be achieved.

Resonant FWM and XPM for Periodic Dispersion Maps

In the present invention a complex dispersion map for WDM transmission systems is provided in which the period length, average dispersion, local dispersion and amplifier span length (separation between adjacent amplifiers) are specifically chosen so that at the desired channel spacing the FWM and XPM interactions are suppressed by the resonance behavior of the dispersion map. That is, the present invention optimizes system performance with respect to both FWM and XPM.

Complex dispersion maps refer to any dispersion maps with periodic variations in dispersion and/or periodic variations in fiber core area. Analysis of such maps cannot in general be done analytically. The calculations can be done numerically. We need to calculate the efficiencies as a function of wavelength (or equivalently frequency) separation $\eta_{XPM}(\Delta\lambda)$ and the $\eta_{FWM}(\Delta\omega)$. Given the fiber types chosen for the dispersion map, and a range over which we can vary the amplifier spacing, we vary the dispersion map period and amplifier spacing such that the $\eta_{XPM}$ and $\eta_{FWM}$ are simultaneously minimized at the channel separation and its integer multiples. In practice we only have to consider wavelength separations out to a few times the channel separation due to the Lorentzian envelopes that multiply $\eta_{XPM}$ and $\eta_{FWM}$. To do this we numerically calculate the expressions in equations 3 and 11. The calculation consists of dividing the transmission line into amplifier spans of length $l_{amp}$ and summing the contributions of the different fibers in each amplifier span to get the contribution (to both $\eta_{XPM}$ or $\eta_{FWM}$) from each span and then summing the span contributions to get the total value of the index.

For a transmission line with constant diepsersion the useable (i.e., antiresonant) parameter space becomes larger as the number of amplifier spans increases. For a transmission line with a dispersion map composed of many fiber types the amount of useable parameter space will depend on the number of amplifier spans as well as the number of periods in the dispersion map. Hence it will generally be desirable to maximize the number of periods. In practice, the transmission line will have the maximum number of periods if the dispersion map period is equal to the amplifier span length.

Figure 4:
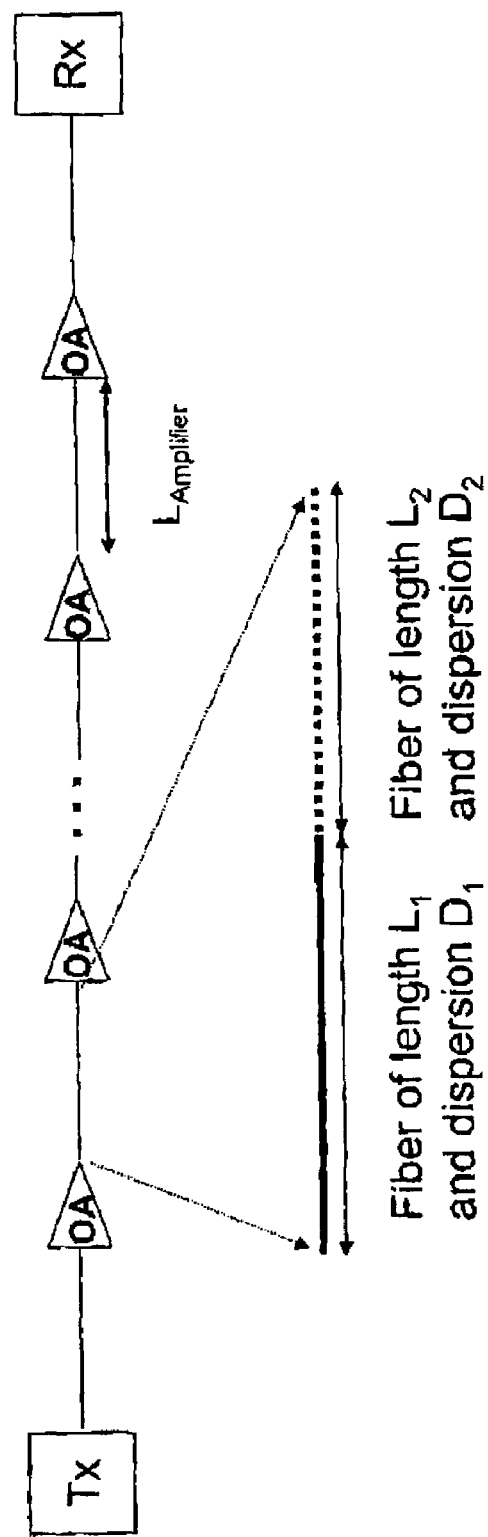
FIG. 4 shows one embodiment of the present invention in which each amplifier span is composed of two lengths of fiber $L_1$ and $L_2$ having dispersion values $D_1$ and $D_2$, respectively.

FIG. 4 shows one embodiment of the present invention in which each amplifier span is composed of two lengths of fiber $L_1$ and $L_2$ having dispersion values $D_1$ and $D_2$ respectively such that $L_1+L_2=L_{amplifier}$ (where $L_{amplifier}$ is the distance between adjacent amplifiers) and $(D_1L_1+D_2L_2)/(L_1+L_2)$ $=D_{average}$ the path average dispersion. The path average dispersion, amplifier span length and local dispersions ($D_1$ and $D_2$) will be chosen such that FWM and XPM are suppressed, at the chosen channel spacings. All wavelength channels will occur at the minima on the FWM and XPM efficiency curves That is, the wavelength channels will be located between the resonances. While each period of the dispersion map can have more than two fiber segments, this may not be practical in many cases because the resonance behavior becomes very hard to calculate.

In some embodiments of the invention a very small (third) length $L_3$ of fiber with dispersion $D_3$ to the path formed $L_1+L_2$ to trim the path average dispersion. If $L_3<<1/\alpha$ ($\alpha$=loss coefficient) then the peak locations shift but the spacings are preserved.

Finally, the antiresonance dispersion map should preferably not degrade single channel performance. This will influence the choice of $D_1\times L_1$ and $D_2\times L_2$.

In some embodiments of the invention the number of periods in the dispersion map can be effectively increased by using fibers with different cross-sectional areas. That is, when considering a dispersion map with a period equal to a single amplifier span a new periodicity can come into play. Fibers of different dispersion values have different core areas. Since intensity is energy/area, light going from one fiber to another fiber having a different core area will experience a change in intensity. As with all nonlinear phenomena in fiber, it is the intensity that drives the resonant behavior, not the power. When all the fiber in the dispersion map has the same core area, energy and intensity can be used interchangeably when referring to fluctuations in signal level. However, as noted, it is the periodicity of the fluctuating intensity that drives the resonance behavior. Accordingly, by providing variations in the fiber core area the periodicity of the dispersion map can be less than the length of an amplifier span. If the core areas are significantly different from one another the number of effective 'spans' N in the resonance formulas can be doubled. Within each span, the large core area fiber should generally be located immediately downstream from the amplifiers, where the signal energy is greatest, to thereby decrease the intensity and thereby the nonlinear penalties.

Figure 5:
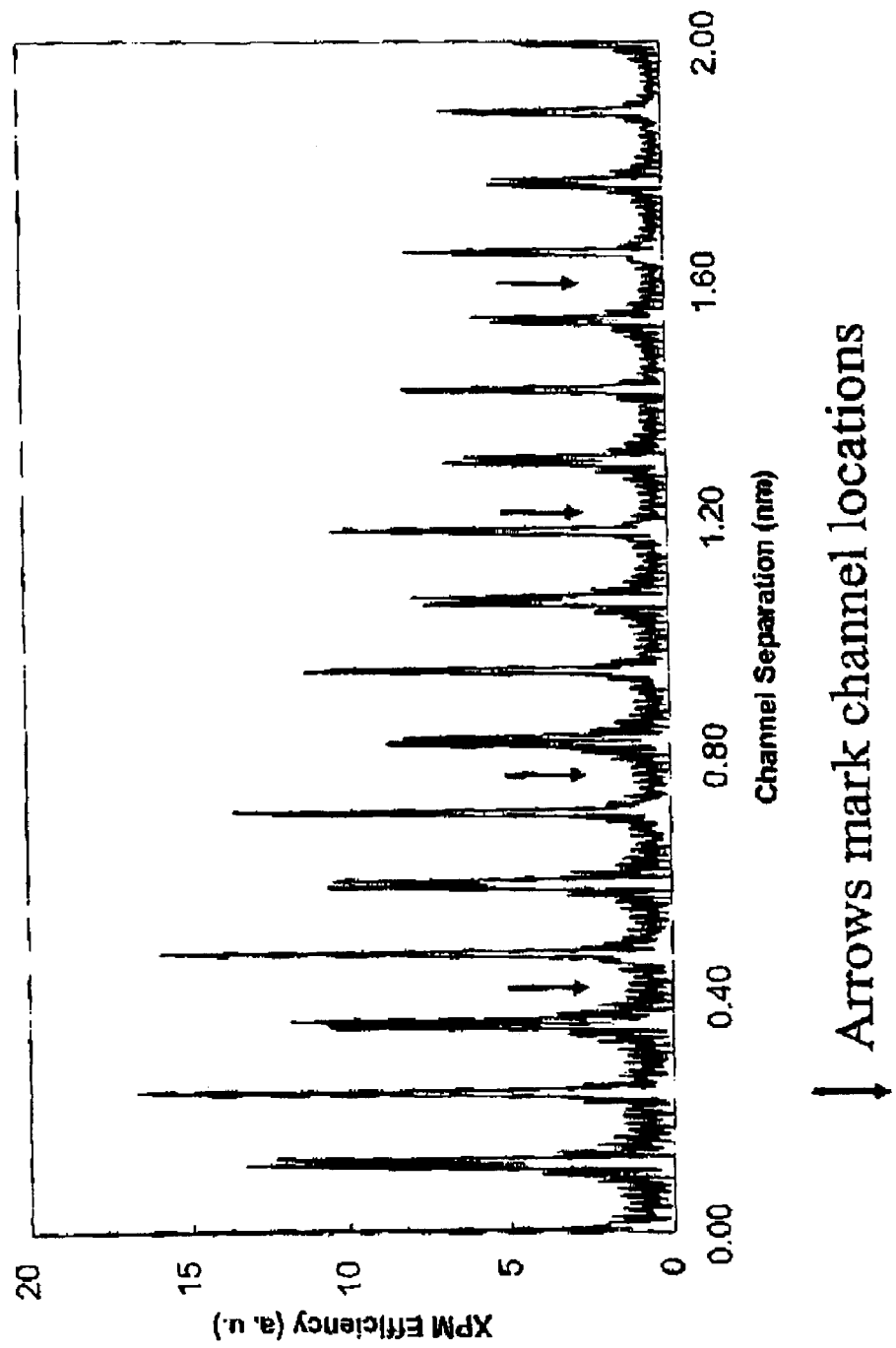
FIG. 5 shows the XPM efficiency versus channel separation.
Figure 6:
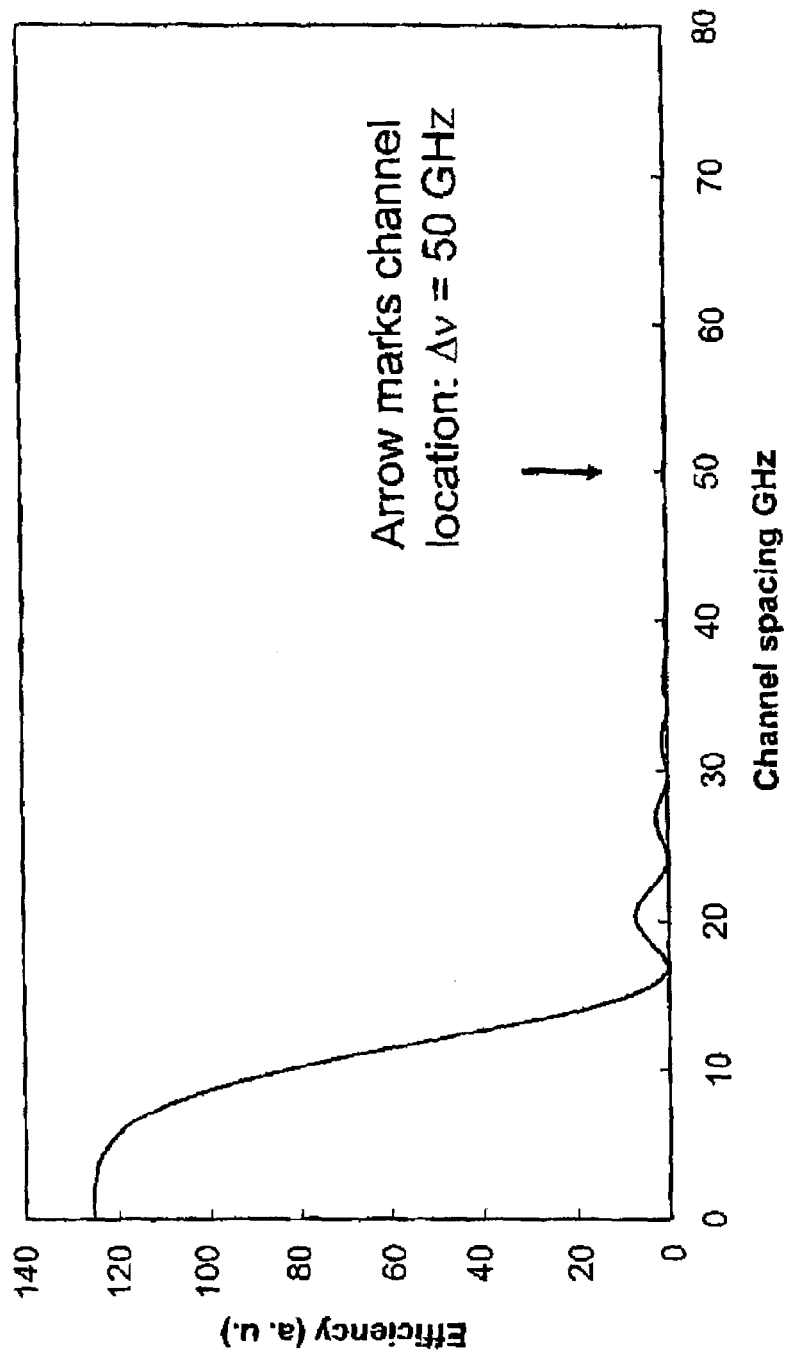
FIG. 6 shows the FWM efficiency versus channel spacing for a dispersion map having two fibers in each period, with $D_1$=17 ps/nm-km and $D_2$=−17 ps/nm-km and $L_1$=$L_2$=25 km.

In the present invention the dispersion map will be selected to manage the width and location of the resonances. The resulting dispersion map will have minimal XPM and FWM penalties at the desired channel spacings. The optimum dispersion map can be determined by performing the proper numeric calculations as outlined above. In general the channel spacing ($\Delta\omega$, $\Delta\lambda$) will be fixed since in most DWDM systems the channel spacings are established by the ITU. FIGS. 5 and 6 shows an exemplary result for $\Delta\lambda=0.40$ nm or $\Delta\omega=2\pi\Delta\nu$ and $\Delta\nu=50$ GHz. FIG. 5 shows the XPM efficiency versus channel separation and FIG. 6 shows the FWM efficiency versus channel spacing for a dispersion map having two fibers in each period, with $D_1=17$ ps/nm-km and $D_2=-17$ ps/nm-km and $L_1=L_2=25$ km. The ratio of the fiber core areas ($A_1^{eff}/A_2^{eff}$) is 2.3:1. This map has $D_{average}=0$, which is highly desirable since it eliminates the dispersive eye penalties and yet has no FWM penalty or XPM penalty, which would otherwise not be true fiber with D=0 or even for most dispersion maps adjusted so that $D_{average}=0$.

The invention claimed is:

1. An optical communication system transmitting a plurality of channel wave lengths, said system comprising:
    a transmitter unit;
    a receiver unit;
    an optical transmission path interconnecting the transmitter and receiver units, said transmission path having a concatenation of optical fibers defining a dispersion map having a period and amplifier spacing selected such that both $\eta_{XPM}$ and $\eta_{FWM}$ are simultaneously minimized at a selected channel separation, wherein $\eta_{XPM}$ and $\eta_{FWM}$ are cross phase modulation efficiency and four wave mixing efficiency respectively, wherein cross phase modulation efficiency is computed from $$\eta_{XPM} = \frac{a^2}{\Omega_m^2(D\Delta\lambda)^2 + a^2}\left[1 + \frac{4\sin^2(\Omega D\Delta\lambda L/2)e^{-aL}}{(1-e^{-aL})^2}\right]$$

and wherein four wave mixing efficiency is computed by $$\eta = \frac{a^2}{N^2(a^2+\Delta\beta^2)}\left[1 + \frac{4e^{-al_{amp}}\sin^2(\Delta\beta l_{amp}/2)}{[1-e^{-al_{amp}}]^2}\right]\frac{\sin^2(N\Delta\beta l_{amp}/2)}{\sin^2(\Delta\beta l_{amp}/2)}.$$

2. The optical communication system of claim 1 further comprising a plurality of optical amplifiers periodically located along said optical transmission path.

3. The optical communication system of claim 2 wherein said dispersion map has a period substantially equal to the periodicity of the optical amplifiers.

4. The optical communication system of claim 3 wherein each period of the dispersion map comprises at least a plurality of constituent fiber having different dispersion values.

5. The optical communication system of claim 3 wherein each period of the dispersion map has a path average dispersion about equal to zero.

6. The optical communication system of claim 2 wherein said dispersion map has a period less than the periodicity of the optical amplifiers.

7. The optical communication system of claim 6 wherein each period of the dispersion map comprises at least a plurality of constituent optical fibers with different cross-sectional areas.

8. The optical communication system of claim 2 wherein each period of the dispersion map comprises at least a plurality of constituent optical fibers with different cross-sectional areas.

9. The optical communication system of claim 1 wherein each period of the dispersion map comprises at least a plurality of constituent fiber having different dispersion values.

10. The optical communication system of claim 1 wherein each period of the dispersion map comprises at least a plurality of constituent optical fibers with different cross-sectional areas.

11. The optical communication system of claim 1 wherein each period of the dispersion map has a path average dispersion about equal to zero.

12. A method of establishing a dispersion map for an optical transmission system transmitting a plurality of channel wavelengths, said optical transmission system having an optical transmission path that includes a plurality of optical amplifiers interconnected by respective transmission spans, said method comprising the steps of:
    selecting a period for the dispersions map; and
    based on the selected dispersion map period and a channel spacing between adjacent ones of the channel wavelengths, selecting a plurality of different dispersion values for each period of the dispersion map, the dispersion map having a period and amplifier spacing selected such that both $\eta_{XPM}$ and $\eta_{FWM}$ are simultaneously minimized at a selected channel separation, wherein $\eta_{XPM}$ and $\eta_{FWM}$ are cross phase modulation efficiency and four wave mixing efficiency respectively, wherein cross phase modulation efficiency is computed from $$\eta_{XPM} = \frac{a^2}{\Omega_m^2(D\Delta\lambda)^2 + a^2}\left[1 + \frac{4\sin^2(\Omega D\Delta\lambda L/2)e^{-aL}}{(1-e^{-aL})^2}\right]$$

and wherein four wave mixing efficiency is computed by $$\eta = \frac{a^2}{N^2(a^2+\Delta\beta^2)}\left[1 + \frac{4e^{-al_{amp}}\sin^2(\Delta\beta l_{amp}/2)}{[1-e^{-al_{amp}}]^2}\right]\frac{\sin^2(N\Delta\beta l_{amp}/2)}{\sin^2(\Delta\beta l_{amp}/2)}.$$

13. The method of claim 12 wherein said dispersion map has a period substantially equal to the periodicity of the optical amplifiers.

14. The method of claim 13 wherein each period of the dispersion map comprises at least a plurality of constituent fiber having different dispersion values.

15. The method of claim 12 wherein each period of the dispersion map comprises at least a plurality of constituent fiber having different dispersion values.

16. The method of claim 12 wherein said dispersion map has a period less than the periodicity of the optical amplifiers.

17. The method of claim 16 wherein each period of the dispersion map comprises at least a plurality of constituent optical fibers with different cross-sectional areas.

18. The method of claim 12 wherein each period of the dispersion map comprises at least a plurality of constituent optical fibers with different cross-sectional areas.

19. The method of claim 12 wherein each period of the dispersion map has a path average dispersion about equal to zero.

* * * * *